US006990219B2

(12) United States Patent
Morimura et al.

(10) Patent No.: US 6,990,219 B2
(45) Date of Patent: Jan. 24, 2006

(54) IMAGE CAPTURING METHOD AND APPARATUS AND FINGERPRINT COLLATION METHOD AND APPARATUS

(75) Inventors: Hiroki Morimura, Kanagawa (JP); Toshishige Shimamura, Kanagawa (JP); Kenichi Saito, Kanagawa (JP); Yukio Okazaki, Kanagawa (JP); Hakaru Kyuragi, Tokyo (JP); Chikara Yamaguchi, Kanagawa (JP); Hiroki Suto, Kanagawa (JP); Satoshi Shigematsu, Kanagawa (JP)

(73) Assignee: Nippon Telegraph and Telephone Corporation, (JP)

( * ) Notice: Subject to any disclaimer, the term of this patent is extended or adjusted under 35 U.S.C. 154(b) by 637 days.

(21) Appl. No.: 10/021,837

(22) Filed: Dec. 12, 2001

(65) Prior Publication Data

US 2002/0146156 A1   Oct. 10, 2002

(30) Foreign Application Priority Data

Dec. 15, 2000 (JP) ............................. 2000-381740
Sep. 11, 2001 (JP) ............................. 2001-274858

(51) Int. Cl.
*G06K 9/00* (2006.01)
(52) U.S. Cl. .................... 382/125; 382/115; 382/299; 382/124; 340/5.53; 340/5.83
(58) Field of Classification Search ............... 382/124, 382/125, 115, 169, 299, 112; 340/5.53, 5.83; 356/71; 902/3; 713/186
See application file for complete search history.

(56) References Cited

U.S. PATENT DOCUMENTS 5,282,063 A * 1/1994 Deacon et al. ............... 358/479
5,659,626 A * 8/1997 Ort et al. ..................... 382/125
6,134,340 A * 10/2000 Hsu et al. .................... 382/124
6,259,804 B1 * 7/2001 Setlak et al. ................. 382/124
6,330,345 B1 * 12/2001 Russo et al. ................. 382/115
6,463,165 B1 * 10/2002 Ito ............................. 382/124

FOREIGN PATENT DOCUMENTS

| EP | 0640933 | 3/1995 |
|---|---|---|
| JP | 3296873 | 4/1990 |
| JP | 06-060167 | 3/1994 |
| JP | 09-069152 | 3/1997 |
| JP | 2000-322559 | 11/2000 |
| WO | WO 98/52157 | 11/1998 |
| WO | WO 99/26187 | 5/1999 |
| WO | WO 02/17221 | 2/2002 |

* cited by examiner

*Primary Examiner*—Bhavesh M. Mehta
*Assistant Examiner*—John Strege
(74) *Attorney, Agent, or Firm*—Blakely Sokoloff Taylor & Zafman

(57) ABSTRACT

An image capturing apparatus includes an image capturing section and capture control section. The image capturing section converts the shape of an object into an electrical quantity in accordance with the parameter value set in a parameter setting section, and outputs image data representing an image corresponding to the shape of the object. The capture control section receives the image data output from the image capturing section, calculates an evaluation index for evaluating the image quality of the image from the image data. If the evaluation index falls outside the range of a preset reference value, the capture control section changes the parameter value set in the parameter setting section so as to make the evaluation index fall within the range of the reference value to output the image data which is received from the image capturing section and the evaluation index of which falls within the range of the reference value. An image capturing method and a fingerprint collation method and apparatus are also disclosed.

14 Claims, 10 Drawing Sheets

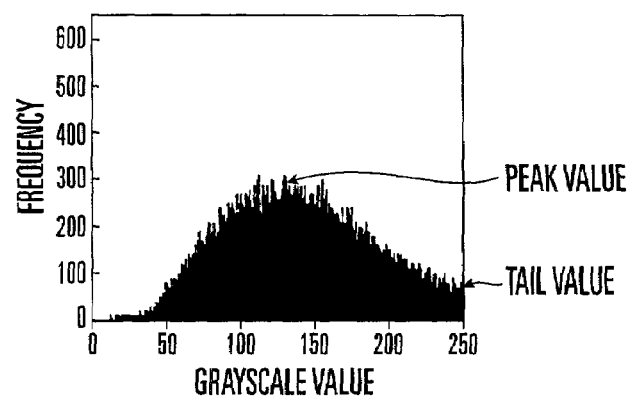
FIG.7A  FIG.7B
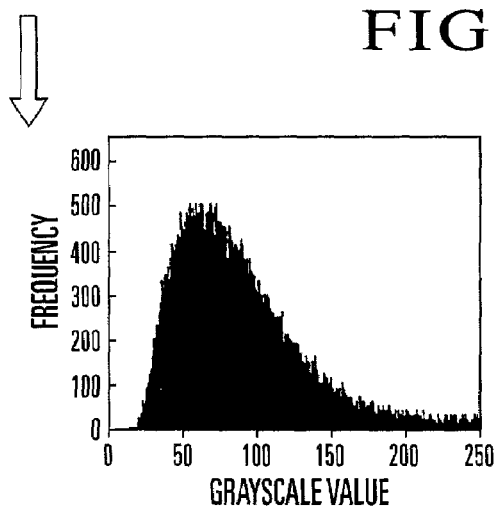
FIG.7C  FIG.7D
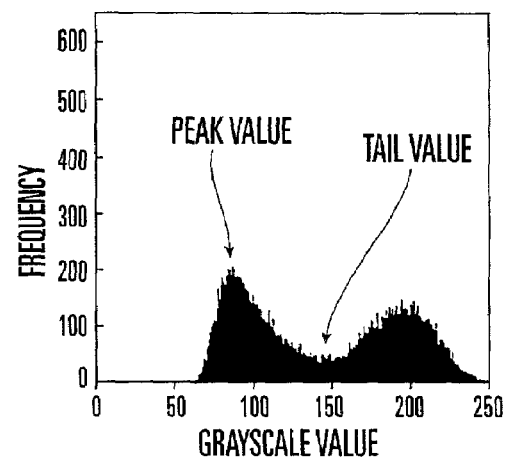
FIG.8A  FIG.8B DETERMINATION AREA
n×m PIXELS

EQUATION FOR N VALUES $$N = \mathrm{MAX}(N_v, N_h)$$

$$N_v = \frac{\sum_{i=1}^{n} N_i}{n} \times \frac{P}{m}$$

$$N_h = \frac{\sum_{i=1}^{m} N_i}{m} \times \frac{P}{n}$$

COUNTED AS RIDGE WHEN SCANNING BEAM CROSSES HVTH
AND LVTH IN ORDER NAMED

IMAGE CAPTURING METHOD AND APPARATUS AND FINGERPRINT COLLATION METHOD AND APPARATUS

BACKGROUND OF THE INVENTION

The present invention relates to an image capturing method and apparatus for capturing the shape of a target object as image data, and a fingerprint collation method and apparatus which detect a fingerprint ridge/valley pattern as image data by using the image capturing method and apparatus and perform collation.

In performing fingerprint collation, to improve collation precision, a fingerprint image must be captured to obtain a clear image of a fingerprint ridge/valley pattern. Fingerprint sensors used to capture fingerprint images in a fingerprint collation apparatus of this type include an optical fingerprint sensor, capacitive fingerprint sensor, and the like. A fingerprint sensor is designed to detect a fingerprint ridge/valley pattern as optical refractive index differences or capacitive value differences and generate the pattern as a halftone image.

According to the above fingerprint collation apparatus, when a user is to be authenticated by using a fingerprint, the fingerprint data of the user is registered in advance. In this state, a fingerprint image of the user is acquired by the fingerprint sensor, and fingerprint data is generated. The generated fingerprint data is then compared with the registered fingerprint data. If they coincide with each other, the user is authenticated.

The skins of human fingertips vary in state among individuals. For example, some persons have dry fingers, and others have fatty fingers. In addition, the state of the skin of a fingertip of a given person changes depending on seasons and physical conditions. In a conventional fingerprint collation apparatus, fingerprint images which change for the above reasons are detected under the same condition, and hence accurate fingerprint images required for collation cannot be obtained. If an image in a desired state cannot be obtained, accurate fingerprint collation cannot be properly performed.

SUMMARY OF THE INVENTION

The present invention has been made to solve the above problem, and has as its object to obtain an image in a desired state.

In order to achieve the above object, according to the present invention, there is provided an image capturing apparatus comprising an image capturing section for converting a shape of an object into an electrical quantity in accordance with a parameter value set in a parameter setting section, and outputting image data representing an image corresponding to the shape of the object, and a capture control section for receiving the image data output from the image capturing section, calculating an evaluation index for evaluating image quality of the image from the image data, and if the evaluation index falls outside a range of a preset reference value, changing the parameter value set in the parameter setting section so as to make the evaluation index fall within the range of the reference value to output image data which is received from the image capturing section and the evaluation index of which falls within the range of the reference value.

BRIEF DESCRIPTION OF THE DRAWINGS

FIGS. 7A to 7D are views showing captured image data and histograms representing the grayscales of images represented by the image data;

FIGS. 8A and 8B are views showing captured image data and a histogram representing the grayscale of an image represented by the image data;

DESCRIPTION OF THE PREFERRED EMBODIMENTS

Embodiments of the present invention will be described below with reference to the accompanying drawings.

<First Embodiment>

Figure 1:
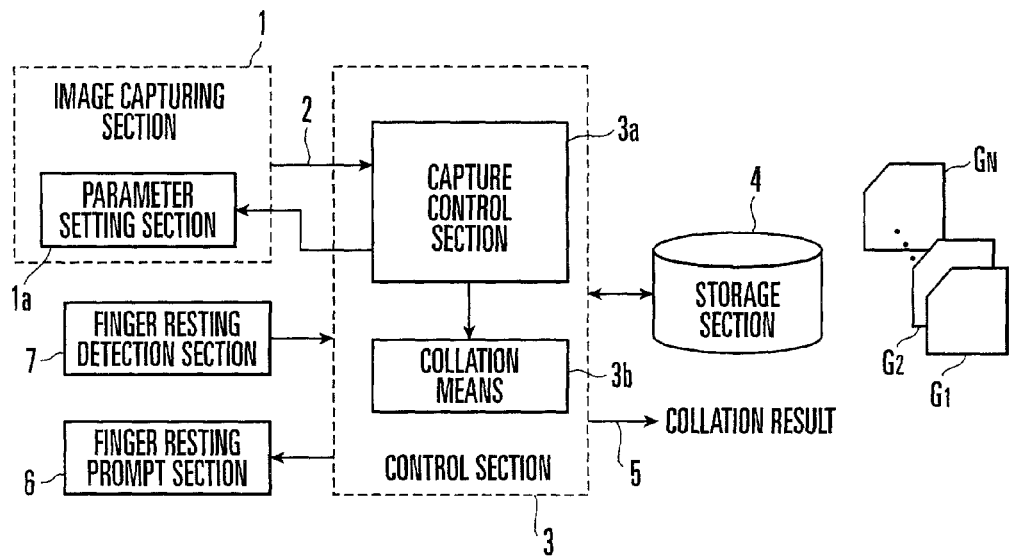
FIG. 1 is a block diagram showing the arrangement of a fingerprint collation apparatus using an image capturing apparatus according to the first embodiment of the present invention.

FIG. 1 shows the arrangement of an image capturing apparatus according to an embodiment of the present invention. This embodiment exemplifies a case where the image capturing apparatus is applied to fingerprint collation and will be described as a fingerprint collation apparatus hereinafter. This fingerprint collation apparatus includes an image capturing section 1 for converting a fingerprint ridge/valley image into image data which is an electrical signal and outputting it. The image capturing section 1 determines a state of conversion to image data in accordance with the parameter set in a parameter setting section 1a.

The apparatus shown in FIG. 1 also includes a storage section 4 storing registered image data $G_1$ to $G_N$ for fingerprint collation, a finger resting prompt section 6 for prompting a user intending to perform collation to rest his/her finger on the image capturing section 1, a finger resting detection section 7 for detecting that the finger is rested on the image capturing section 1, and a control section 3 for controlling the overall apparatus.

The control section 3 includes a capture control section 3a formed by a CPU for performing predetermined computation processing in accordance with a program. The capture control section 3a determines the image data output from the image capturing section 1 first, and then changes the parameter in the parameter setting section 1a. The control section 3 also includes a collation means 3a for collating image data 2 captured by the image capturing section 1 with the registered image data $G_1$ to $G_N$ stored in the storage section 4 and outputting the resultant data as a collation result 5. These capture control section 3a and collation means 3b are implemented by programs.

Figure 2:
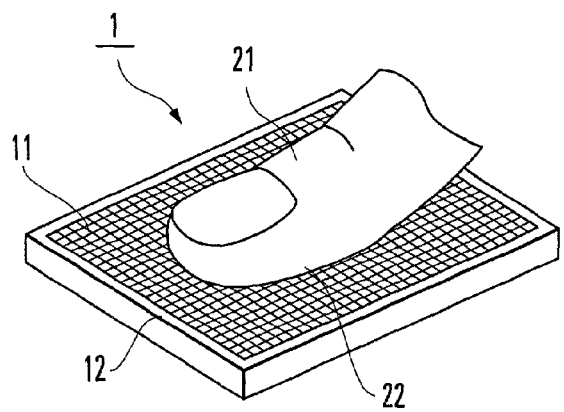
FIG. 2 is a perspective view showing the arrangement of part of the image capturing section of the fingerprint collation apparatus in FIG. 1.
Figure 3:
FIG. 3 is a view for explaining the state of fingerprint image data captured by the image capturing section.

FIG. 2 shows the arrangement of the image capturing section 1. Many sensor cells 11 are vertically and horizontally arranged on a detection surface 12 of the image capturing section 1 in the form of a matrix. The sensor cells 11 are formed by elements for converting a fine ridge/valley pattern of a target into an electrical quantity. When a finger 21 touches the detection surface 12, the respective sensor cells 11 detect a ridge/valley pattern of a fingerprint 22. As the detection result obtained by all the sensor cells, one image data 2 representing a fingerprint image like the one shown in FIG. 3 is output from the image capturing section 1.

Figure 4:
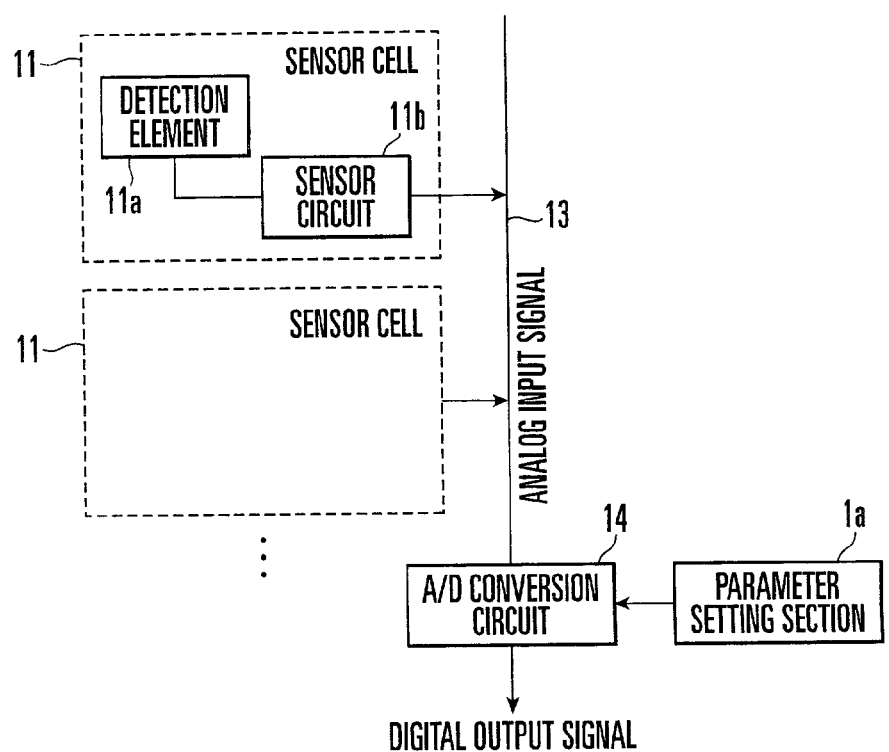
FIG. 4 is a block diagram showing the schematic arrangement of the image capturing section.

FIG. 4 shows the arrangement of the image capturing section 1. Each sensor cell 11 is comprised of a detection element 11a and sensor circuit 11b. The detection element 11a is, for example, a capacitive sensor formed by an electrode having an insulating layer formed on its surface. The detection element 11a may be an optical sensor formed by a photodiode or the like.

The detection element 11a converts a fingerprint ridge/valley pattern into an electrical signal. The sensor circuit 11b then amplifies the converted signal. The output of the sensor circuit 11b of each sensor cell 11 is connected to a common data line 13. The sensor cells 11 are sequentially selected to output an analog signal corresponding to a fingerprint ridge/valley pattern to the data line 13.

An A/D conversion circuit 14 sequentially converts the analog signals transmitted through the data line 13 into, for example, 256-level grayscale digital signals in accordance with the parameter set in the parameter setting section la, and outputs the signals. When the digital signals from all the sensor cells 11 are arranged in the form of a matrix so as to reflect the positions of the respective sensor cells, fingerprint image data like that shown in FIG. 3 is obtained.

Note that the A/D conversion circuit 14 is designed to convert an analog signal corresponding to a fingerprint ridge/valley pattern into a digital signal. The relationship between the analog value and the digital value changes in accordance with the parameter value set in the parameter setting section 1a.

Figure 5:
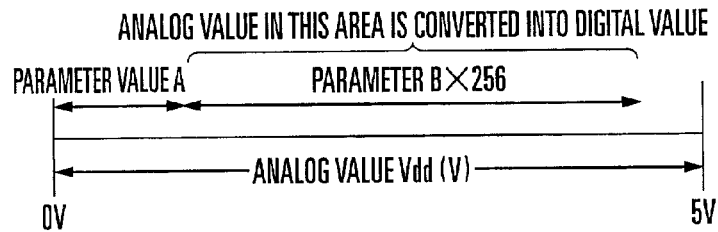
FIG. 5 is a view for explaining examples of the parameters set in an A/D conversion circuit 14.

FIG. 5 exemplifies the parameters set in the A/D conversion circuit 14 (FIG. 4). Parameters A and B are rational numbers equal to or larger than 0. If the analog value input to the A/D conversion circuit 14 has a level less than a set parameter value (A+B), 0-level grayscale fingerprint image data is obtained from the A/D conversion circuit 14. The 0-level grayscale fingerprint image data represents a black image.

If the analog value input to the A/D conversion circuit 14 is equal to or larger than a set parameter value (A+255×B), 255-level grayscale fingerprint image data is obtained from the A/D conversion circuit 14. The 255-level grayscale fingerprint image data represents a white image. If the analog value input to the A/D conversion circuit 14 is equal to or larger than a parameter value (A+n×B) and less than a parameter value {A+(n+1)×B}, n-level grayscale image data is obtained from the A/D conversion circuit 14.

As described above, if the parameter value A is set to be large, the fingerprint image obtained from the A/D conversion circuit 14 become black. If the parameter value A is set to be small, the fingerprint image obtained from the A/D conversion circuit 14 becomes white. If the parameter value B is set to be large, the fingerprint image obtained from the A/D conversion circuit 14 decreases in resolution. If the parameter value B is set to be small, the fingerprint image obtained from the A/D conversion circuit 14 increases in resolution. Note that the number of grayscale levels is not limited to 256 and may be 64 or 128.

Note that the above parameter values A and B are used as parameters set in the parameter setting section 1a to be used for conversion in the image capturing section 1. However, the present invention is not limited to them. For example, brightness and resolution can be controlled in the same manner even by using the minimum and maximum values of a signal conversion range as the parameter values A and B, respectively.

As described above, by changing the parameter values in the A/D conversion circuit 14, the brightness and resolution of the fingerprint image obtained from the A/D conversion circuit 14 can be changed. If, therefore, the fingerprint images of human fingertips, which change their states depending on individual differences, e.g., dry fingers and fatty fingers, seasons, and physical conditions, accurate fingerprint images free from the influences of individual differences and state changes can be acquired by capturing images upon setting appropriate parameter values.

Figure 6:
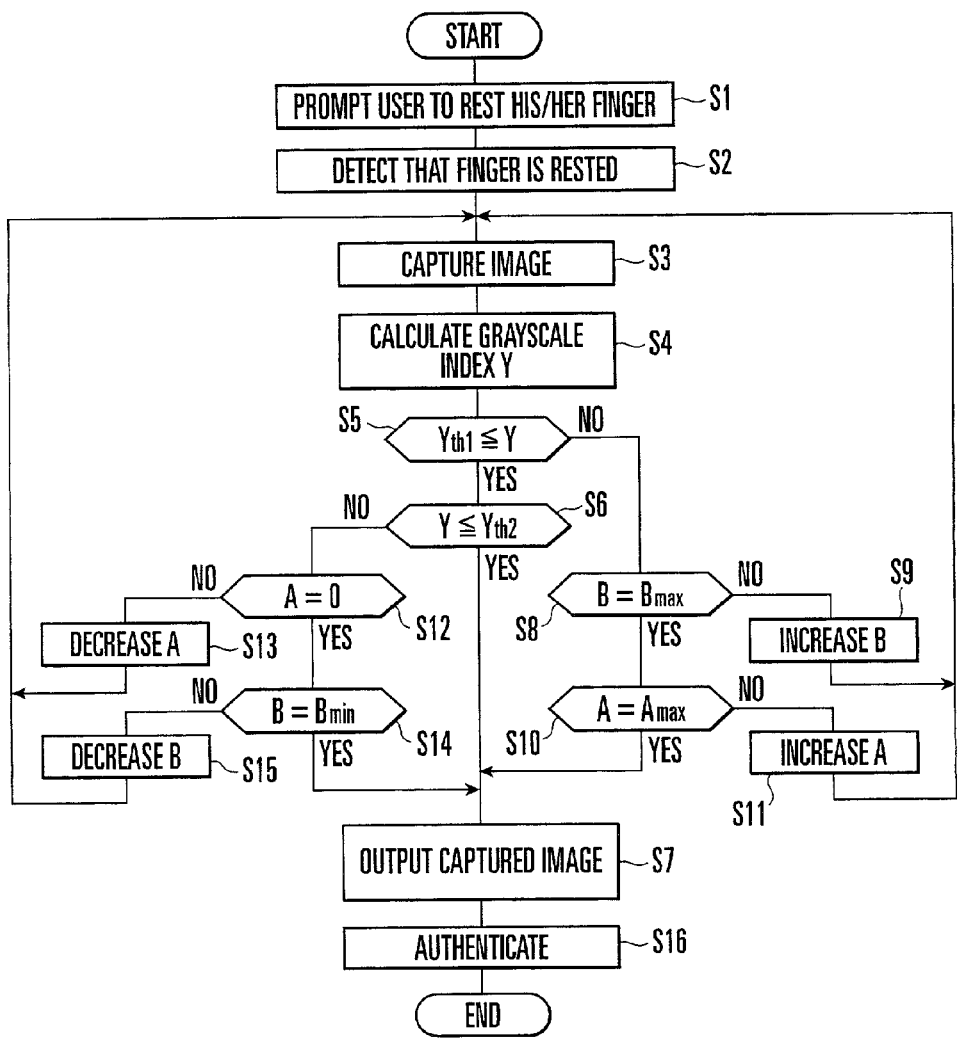
FIG. 6 is a flow chart showing the operation of the fingerprint collation apparatus according to the first embodiment of the present invention.

The operation of the fingerprint collation apparatus (image capturing apparatus) according to this embodiment will be described next with reference to the flow chart of FIG. 6.

First of all, the capture control section 3a of the control section 3 causes the finger resting prompt section 6 to prompt the user intending to perform collation to rest his/her finger on the detection surface 12 (FIG. 2) of the image capturing section 1 (step S1). More specifically, for example, the finger resting prompt section 6 prompts the user to rest his/her finger by displaying a prompt using a display unit such as an LED or light-emitting element, turning on a predetermined indication, or outputting a voice message. After the finger resting detection section 7 detects that the user rests his/her finger on the detection surface 12 upon prompting (step S2), the image capturing section 1 captures a fingerprint image and outputs the image data 2 (step S3).

When the image data 2 is output, the capture control section 3a calculates a grayscale index Y, as an image quality evaluation, which indicates the density of the captured image (step S4). Any kind of index can be used as a grayscale index as long as it indicates the density balance of image data to be evaluated. For example, the ratio of the number of pixels with grayscale values equal to or less than a predetermined grayscale value to the total number of pixels of image data may be used as an index. Alternatively, an index may be calculated by using a predetermined area, e.g., an area near the center of the detection surface 12, as a target area instead of using the total number of pixels. In this case, a grayscale index can be calculated within a short period of time as compared with the case where the total number of pixels are targeted.

In steps S5 to S15, the capture control section 3a compares the grayscale index Y obtained in the above manner with preset threshold $Y_{th1}$ and $Y_{th2}$.

First of all, in step S5, the capture control section 3a checks whether the calculated grayscale index Y is equal to or more than the threshold $Y_{th1}$. If it is determined in step S5 that the grayscale index Y is equal to or more than the threshold $Y_{th1}$, the flow advances to step S6 to check whether the grayscale index Y is equal to or less than the threshold $Y_{th2}$. If it is determined in step S6 that the grayscale index Y is equal to or less than the threshold $Y_{th2}$, the flow advances to step S7, in which the capture control section 3a outputs the captured image data to the collation means 3b.

If it is determined in step S5 that the grayscale index Y is less than the threshold $Y_{th1}$, the flow advances to step S8 to check whether the parameter B set in the parameter setting section 1a is the maximum value.

If it is determined in step S8 that the set parameter B is not the maximum value, the flow advances to step S9, in which the capture control section 3a increases the parameter B in the parameter setting section 1a by a predetermined value. The flow then returns to step S3. If it is determined in step S8 that the parameter B set in the parameter setting section 1a is the maximum value, the flow advances to step S10 to check whether the parameter A set in the parameter setting section 1a is the maximum value.

If it is determined in step S10 that the set parameter A is not the maximum value, the flow advances to step S11, in which the capture control section 3a increases the parameter A in the parameter setting section 1a by a predetermined value. The flow then returns to step S3. If it is determined in step S10 that the parameter is the maximum value, the flow advances to step S7, in which the capture control section 3a outputs the captured image data to the collation means 3b.

If $Y<Y_{th1}$, since the captured image is slightly light-colored, a fingerprint image is captured again upon increasing the parameter values A and B in the above manner.

If it is determined in step S6 that the grayscale index Y exceeds the threshold $Y_{th2}$, the flow advances to step S12 to check whether the parameter value A set in the parameter setting section 1a is the minimum value, e.g., 0.

If it is determined that the set parameter value A is not 0, the flow advances to step S13 to decrease the parameter value A in the parameter setting section 1a by a predetermined value. The flow then returns to step S3. If it is determined in step S12 that the parameter value A set in the parameter setting section 1a is 0, the flow advances to step S14 to check whether the parameter value B set in the parameter setting section 1a is the minimum value.

If it is determined in step S14 that the set parameter value B is not the minimum value, the flow advances to step S15, in which the capture control section 3a decreases the parameter value B in the parameter setting section 1a by a predetermined value. The flow then returns to step S3. If it is determined in step S14 that the parameter value B is the minimum value, the flow advances to step S7, in which the capture control section 3a outputs the captured image data to the collation means 3b.

If $Y_{th2}<Y$, since the captured image is slightly dark-colored, a fingerprint image is captured again upon decreasing the parameter values A and B in the above manner.

The capture control section 3a repeats the above series of operations until the image quality of image data satisfies a predetermined condition. When the condition is satisfied, the capture control section 3a outputs the image data as an image suitable for authentication to the collation means 3b. As described above, according to this embodiment, an image in a desire state which falls within the ranges of set parameters can be obtained.

Subsequently, the collation means 3b, which has received the image data, performs authentication processing by comparing the received image data with the registered image data $G_1$ to $G_N$ stored in the storage section 4.

According to the above description, a grayscale index is used as an image quality evaluation index for captured image data. However, the present invention is not limited to this. For example, saturation, lightness, contrast, or the like may be used as an index.

In addition, a spatial frequency component extracted from captured image data by a Fourier transform may be used as an index. In this case, in addition to a grayscale level, whether the response of a fingerprint is properly acquired as an image can be evaluated. Furthermore, an image may be evaluated in combination with a grayscale index.

<Second Embodiment>

Another embodiment of the present invention will be described next.

In the above embodiment, a grayscale index is used as an image quality evaluation index. The ridges of fingerprint patterns differ in thickness and intervals among target persons. For this reason, image data determined as data having optimal image quality on the basis of a grayscale index may not be image data having optimal image quality for authentication. In the following embodiment, for example, a histogram index is used for evaluation of image quality to solve the above problem. Note that the ridges are lines forming a pattern obtained from the ridge portions of a fingertip skin surface.

As shown in FIGS. 7A to 7D, a histogram index from which a histogram representing the grayscale of an image represented by captured image data is generated can be calculated from the captured image data. Referring to FIG. 7, the abscissa represents the grayscale value; and the ordinate, the frequency. Grayscale values represent the densities between black and white in 256 levels (grayscale levels). Grayscale level 0 represents black, and grayscale level 225 represents white. A histogram index like that shown in FIG. 7B is calculated from captured image data like that shown in FIG. 7A. A histogram index like that shown in FIG. 7D is calculated from captured image data like that shown in FIG. 7C.

In general, when image data is captured as shown in FIG. 8A, two peak portions representing the density of a ridge and noise or the like appear in a histogram as shown in FIG. 8B. As will be described below, if a calibration circuit is provided for an image capturing section 1 (FIG. 1) to suppress/reduce noise and the like, only one peak portion representing the density of a ridge can be made to appear in a histogram, as shown in FIGS. 7B and 7D.

In this embodiment, the frequency which is located on the small grayscale value side indicated by the histogram index and exhibits the maximum value on the high density side is regarded as a peak value, whereas the frequency which corresponds to the minimum value immediately near the peak value on the lower density side than that of the peak value is regarded as a tail value. The histogram index H is defined as H=peak value/tail value. In this embodiment, since grayscale value 255 represents white, the tail value exists on the right side of the peak value in the histogram shown in FIG. 7. Referring to FIG. 8, since the peak portion representing the density of the ridge exists on the high density side of the image in the histogram, the minimum value between the two peak portions becomes a tail value, and the maximum value of the peak portion on the left of the tail value represents the peak value.

As the value of the histogram index H defined in the above manner decreases, the contrast of the image decreases, and vice versa. In this embodiment, parameters A and B are set on the basis of this histogram index H. In image data with little black and white difference as shown in FIG. 7A, the histogram index H (=peak value/tail value) becomes small as shown in FIG. 7B.

In this case, the values of the parameters A and B are set to increase the histogram index H so as to obtain a result like that shown in FIG. 7D. With this operation, the contrast of the fingerprint image increases as shown in FIG. 7C, thereby obtaining a clear fingerprint image. As described above, by setting the parameters A and B to make the histogram index H fall within a preset reference value range, i.e., an appropriate range, a fingerprint image suitable for fingerprint authentication can be acquired regardless of the density of a fingerprint.

Figure 9:
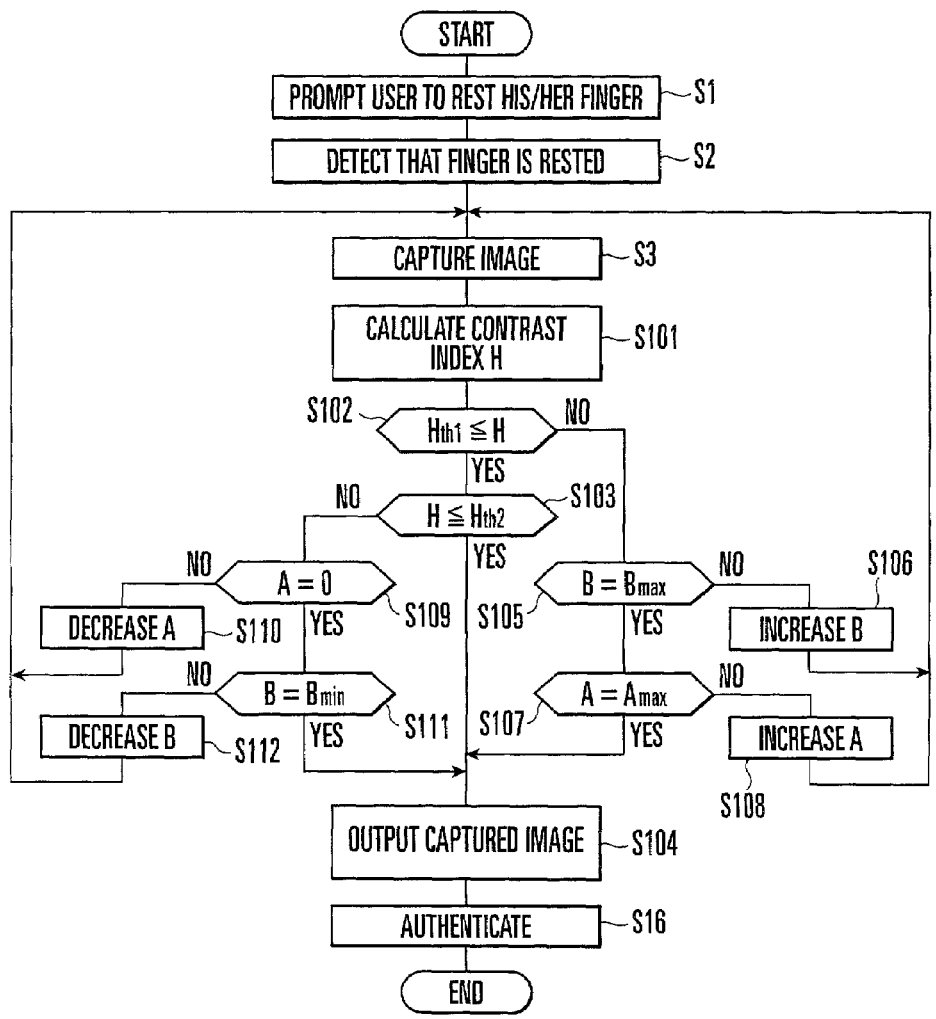
FIG. 9 is a flow chart showing the operation of a fingerprint collation apparatus according to the second embodiment of the present invention.

The operation of a fingerprint collation apparatus (image capturing apparatus) using a histogram index as an evaluation index will be described next with reference to the flow chart of FIG. 9.

A capture control section 3a of a control section 3 causes a finger resting prompt section 6 to prompt a user intending to perform collation to rest his/her finger on a detection surface 12 (FIG. 2) of the image capturing section 1 (step S1). More specifically, for example, the finger resting prompt section 6 prompts the user to rest his/her finger by displaying a prompt using a display unit such as an LED or light-emitting element, turning on a predetermined indication, or outputting a voice message. After a finger resting detection section 7 detects that the user rests his/her finger on the detection surface 12 upon prompting-(step S2), the image capturing section 1 captures a fingerprint image and outputs image data 2 (step S3). These operations are the same as those in the embodiment shown in FIG. 6.

In this embodiment, when the image data 2 is output, the capture control section 3a calculates the histogram index H as an image quality evaluation index for the captured image from the image data 2 (step S101). Note that the histogram index H may be calculated from a predetermined area of the captured image, e.g., an area near the center of the detection surface 12, instead of all the pixels of the captured image. In this case, the histogram index H can be calculated within a short period of time as compared with the case where all the pixels are targeted.

In steps S102 to S112, the capture control section 3a compares the histogram index H obtained in the above manner with preset thresholds $H_{th1}$ and $H_{th2}$.

First of all, in step S102, the capture control section 3a checks whether the calculated histogram index H is equal to or more than the threshold $H_{th1}$. If it is determined in step S102 that the histogram index H is equal to or more than the threshold $H_{th1}$, the flow advances to step S103 to check whether the histogram index H is equal to or less than the threshold $H_{th2}$. If it is determined in step S103 that the histogram index H is equal to or less than the threshold $H_{th2}$, the flow advances to step S104, in which the capture control section 3a outputs the captured image data to a collation means 3b.

If it is determined in step S102 that the histogram index H is less than the threshold $H_{th1}$, the flow advances to step S105 to check whether the parameter value B set in a parameter setting section 1a is the maximum value.

If it is determined in step S105 that the set parameter value B is not the maximum value, the flow advances to step S106, in which the capture control section 3a increases the parameter value B in the parameter setting section 1a by a predetermined value. The flow then returns to step S3. If it is determined in step S105 that the parameter value B set in the parameter setting section 1a is the maximum value, the flow advances to step S107 to check whether the parameter value A set in the parameter setting section 1a is the maximum value.

If it is determined in step S107 that the set parameter value A is not the maximum value, the flow advances to step S108, in which the capture control section 3a increases the parameter value A in the parameter setting section 1a by a predetermined value. The flow then returns to step S3. If it is determined in step S107 that the parameter value A is the maximum value, the flow advances to step S104, in which the capture control section 3a outputs the captured image data to the collation means 3b.

If $H<H_{th1}$, since the contrast of the captured image is slightly low, a fingerprint image is captured again upon increasing the parameter values A and B in the above manner.

If it is determined in step S103 that the histogram index H exceeds the threshold $H_{th2}$, the flow advances to step S109 to check whether the parameter value A set in the parameter setting section 1a is the minimum value, e.g., 0.

If it is determined that the set parameter value A is not 0, the flow advances to step S110, in which the capture control section 3a decreases the parameter value A in the parameter setting section 1a by a predetermined value. The flow then returns to step S3. If it is determined in step S109 that the parameter value A set in the parameter setting section 1a is 0, the flow advances to step S111 to check whether the parameter value B set in the parameter setting section 1a is the minimum value.

If it is determined in step S111 that the set parameter value B is not the minimum value, the flow advances to step S112, in which the capture control section 3a decreases the parameter value B in the parameter setting section 1a by a predetermined value. The flow then returns to step S3. If it is determined in step S111 that the parameter value B is the minimum value, the flow advance sot step S104, in which the capture control section 3a outputs the captured image data to the collation means 3b.

If $H_{th2}<H$, since the contrast of the captured image is slightly high, a fingerprint image is captured again upon decreasing the parameter values A and B in the above manner.

The capture control section 3a repeats the above series of operations until the image quality of image data satisfies a predetermined condition. When the condition is satisfied, the capture control section 3a outputs the image data as an image suitable for authentication to the collation means 3b. As described above, according to this embodiment, a fingerprint image with excellent contrast can be acquired without being influenced by the density of a fingerprint pattern and individual differences.

Note that if the condition cannot be satisfied even when the parameters A and B take the maximum or minimum values, exceptional processing is performed to output the currently captured image. Subsequently, the collation means 3b, which has received the image data, performs authentication processing by comparing the received image data with registered image data $G_1$ to $G_N$ stored in a storage section 4.

In this embodiment, the above operation may be performed after the histogram of the captured fingerprint image is smoothed. This makes it possible to reduce the influence of fluctuations in histogram due to noise, variations, or the like.

Figure 10:
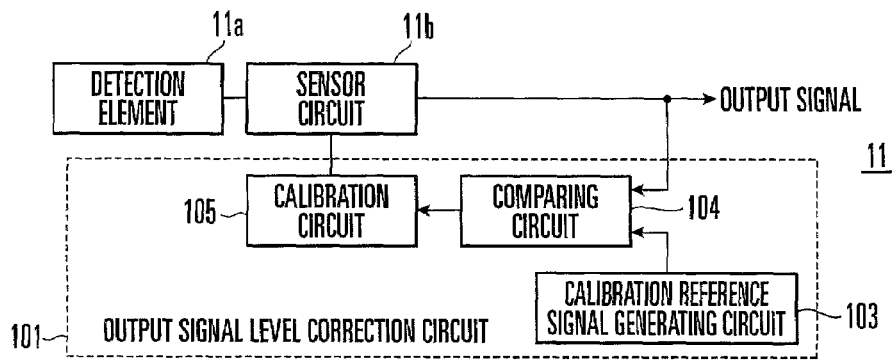
FIG. 10 is a block diagram showing the arrangement of part of the fingerprint collation apparatus according to the second embodiment of the present invention.

An example of the arrangement of the fingerprint collation apparatus (image capturing apparatus) according to this embodiment, an example of the operation of which has been described with reference to the flow chart of FIG. 9, will be described below. An arrangement in which a calibration circuit is provided for the image capturing section 1 (FIG. 1) to suppress/reduce noise and the like will be described below. FIG. 10 shows the arrangement of the image capturing section 1 having a calibration circuit 105. Note that since many sensor cells have the same arrangement, FIG. 10 representatively shows one sensor cell.

As shown in FIG. 10, a sensor cell 11 is comprised of a detection element 11a, sensor circuit 11b, and output signal level correction circuit 101. The output signal level correction circuit 101 receives an output from the sensor circuit 11b and supplies the output from the sensor circuit 11b to one of the inputs of a comparing circuit 104. The comparing circuit 104 compares the output from the sensor circuit 11b with the calibration reference value (signal) output from a calibration reference signal generating circuit 103. The calibration circuit 105 adjusts (corrects) the output level of the sensor circuit 11b by performing gain control on the input side of the sensor circuit 11b or the sensor circuit 11b so as to eliminate the difference between the above two values, which is output from the comparing circuit 104.

The calibration reference signal generating circuit 103 is preferably configured to generate calibration reference signals at the same level to the respective sensor cells.

Any known arrangement that has the function of minimizing variations in outputs from the respective sensor cells 11 and operates in the above manner can be used as the output signal level correction circuit 101. With this arrangement, the outputs of the respective sensor circuits, i.e., the output levels of the respective sensor cells 11, can be adjusted to the same level, thus suppressing noise due to sensitivity variations and eliminating a peak portion due to noise from a histogram index like that shown in FIG. 8B.

Figure 11:
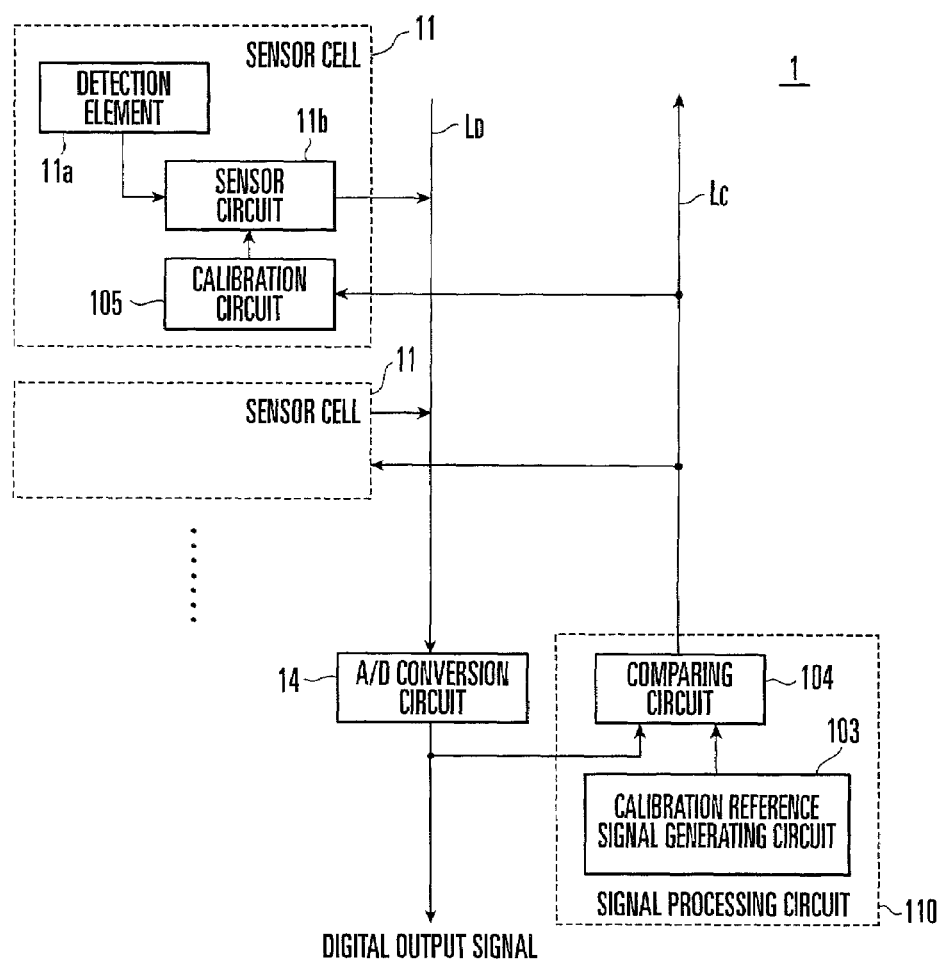
FIG. 11 is a block diagram showing the arrangement of part of the fingerprint collation apparatus according to the second embodiment of the present invention.

This arrangement will be described in more detail below. FIG. 11 shows the arrangement of part of the image capturing section 1 formed by the sensor cells 11 each having the calibration circuit 105. Each sensor cell 11 has the same arrangement and is comprised of the detection element 11a, sensor circuit 11b, and calibration circuit (sensitivity adjusting circuit) 105. The detection sensitivity of each sensor cell 11 is adjusted by using the calibration circuit 105. Each sensor cell includes the calibration circuit 105, a signal processing circuit 5, and a control line $L_C$.

The sensor cell 11 is comprised of the detection element 11a, sensor circuit 11b, and calibration circuit 105. The detection element 11a is an element for converting a surface shape into an electrical signal. The sensor circuit 11b is a circuit for measuring an electrical quantity in the detection element 11a which changes depending on the surface shape.

When the output level of each sensor cell 11 is to be corrected, i.e., calibration is to be,performed, a reference sample without any uneven pattern is detected as a measurement target by the sensor cell 11 or detection is performed without any object placed on the sensor cell, thereby making each sensor cell 11 detect the same measurement value. The signal output from the sensor cell 11 is input to an A/D conversion circuit 14 through a data line $L_D$ and output as a digital output signal 4A.

The digital output signal 4A output from the A/D conversion circuit 14 is input to the signal processing circuit 110. The signal processing circuit 110 compares the digital output signal 4A output form the A/D conversion circuit 14 with the digital output signal which should be output (to be referred to as an expected value hereinafter) to calculate an adjustment parameter for adjusting the detection sensitivity of the sensor circuit 11b. The calibration circuit 105 is then controlled through the control line $L_C$ on the basis of the calculated adjustment parameter.

The data line $L_D$ and control line $L_C$ are common to the respective sensor cells 11. The sensor cells 11 are sequentially selected, and output signals 2A from the sensor cells 11 are sequentially input to the A/D conversion circuit 14. As a consequence, the signal processing circuit 110 controls the calibration circuit 105 in the sensor cell 11.

The sensitivity of each sensor circuit 11b is adjusted by repeating this operation once or more for each sensor cell, thereby making the performance of each sensor cell 11 uniform.

In this case, the signal processing circuit 110 includes the comparing circuit 104 and calibration reference signal generating circuit 103 described with reference to FIG. 10 as other signal processing circuits 110. In the case shown in FIG. 11, the input signal is a digital signal. Then a digital signal is input to the comparing circuit 104 without any conversion, a known digital comparing circuit can be used as the comparing circuit 104. If the comparing circuit 104 is a general analog comparing circuit, an input signal is D/A-converted first and then supplied to the comparing circuit 104. The same applies to the calibration reference signal generating circuit 103.

Figure 12:
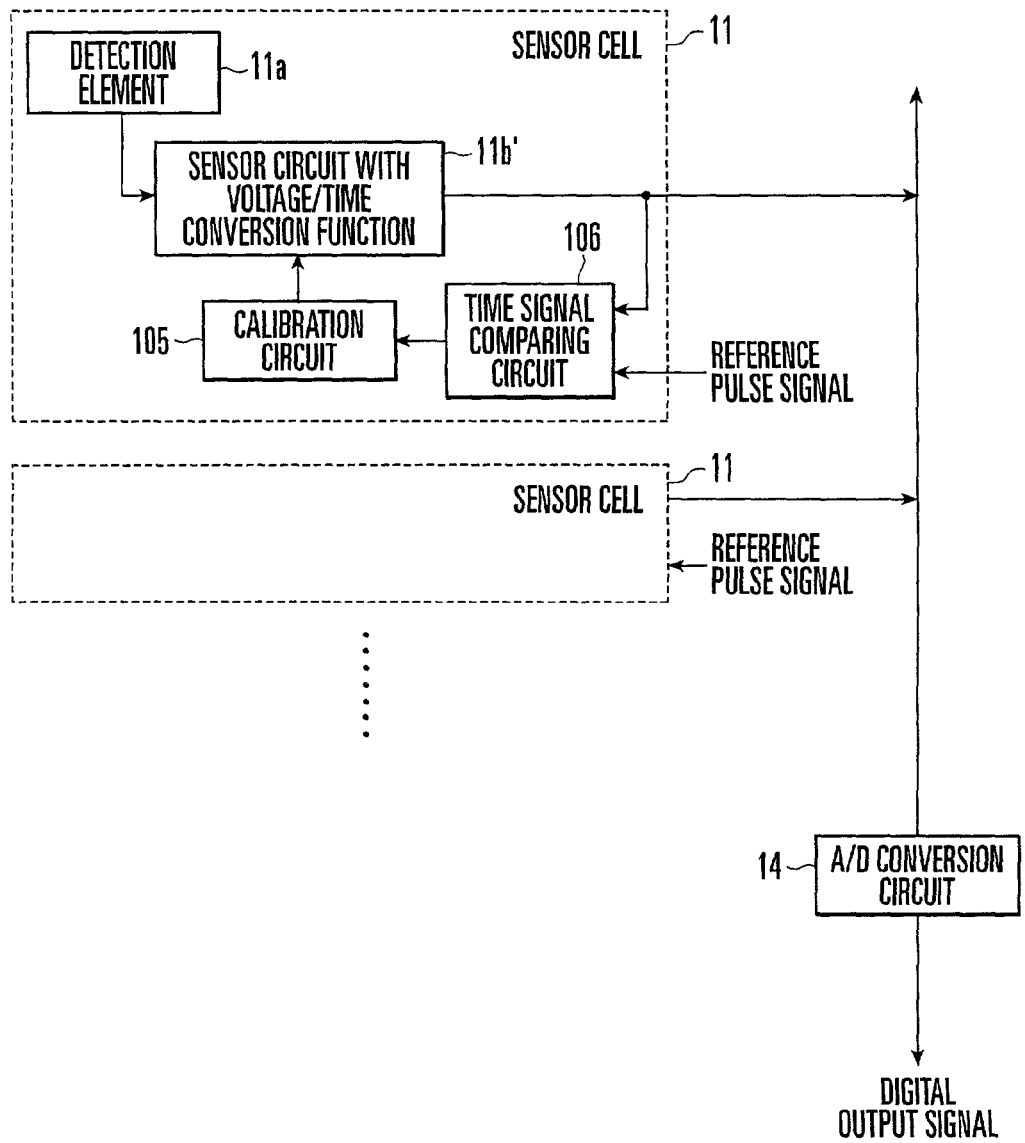
FIG. 12 is a block diagram showing the arrangement of part of the fingerprint collation apparatus according to the second embodiment of the present invention.

As shown in FIG. 12, an image capturing section 1 may be formed by sensor cells 11 each having a calibration circuit 105. The image capturing section 1 shown in FIG. 12 uses a sensor circuit 11b' with a voltage/time conversion function and a time signal comparing circuit 106. The sensor circuit 11b' with the voltage/time conversion function is a sensor circuit for converting an output signal corresponding to an electrical quantity from the detection element 11a into a signal that changes along the time axis. The time signal comparing circuit 106 compares the voltage/time conversion signal output from the sensor circuit 11b' with the voltage/time conversion function with a calibration reference signal, and outputs the signal difference as a control signal to the calibration circuit 105. When each sensor cell 11 of the image capturing section 1 is to be calibrated, a reference sample without any uneven pattern is detected as a measurement target by the sensor cell 11, thereby making each sensor cell 11 detect the same measurement value.

Figure 14:
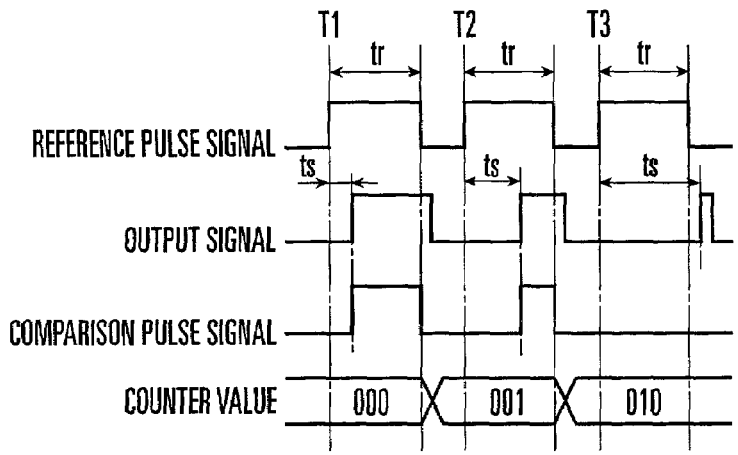
FIG. 14 is a timing chart showing a specific example of the operation of the fingerprint collation apparatus in FIG. 13.

The sensor circuit 11b' with the voltage/time conversion function converts a signal having analog information as a voltage value into a signal having analog information in the time axis direction, and outputs the resultant signal as an output signal 2B like that shown in FIG. 14 (see FIG. 14: $t_s$ is output time and changes). The output signal 2B is input to the A/D conversion circuit 14 through the data line $L_D$ and output as a digital output signal. At the same time, the output signal 2B is supplied to the calibration circuit 105 through the time signal comparing circuit 106 in the sensor cell 11. The time signal comparing circuit 106 corresponds to the comparing circuit 102 in FIG. 10 and obtains the time difference between the output signal 2B from the sensor circuit 11b' with the voltage/time conversion function and a reference pulse signal having a reference time $t_R$ from the calibration reference signal generating circuit.

The time signal comparing circuit 106 compares the signal voltage/time-converted by the sensor circuit 11b' with the voltage/time conversion function with the reference pulse signal, and sends a comparison pulse signal representing the time difference between them to the calibration circuit 105. With this operation, the calibration circuit 105 performs control operation to eliminate the time difference from the output from the sensor circuit 11b' with the voltage/time conversion function. The data line $L_D$ is shared by the plurality of sensor cells 11. The sensor cells 11 are sequentially selected, and the above operation is performed.

By repeating the above operation once or more for each sensor cell 11, the sensitivity of each sensor circuit 11b' with the voltage/time conversion function to make the performance of each sensor cell 11 uniform. Even if a plurality of sensor cells 11 are simultaneously selected, calibration can be concurrently performed for each sensor cell. This makes it possible to perform calibration at high speed.

Figure 13:
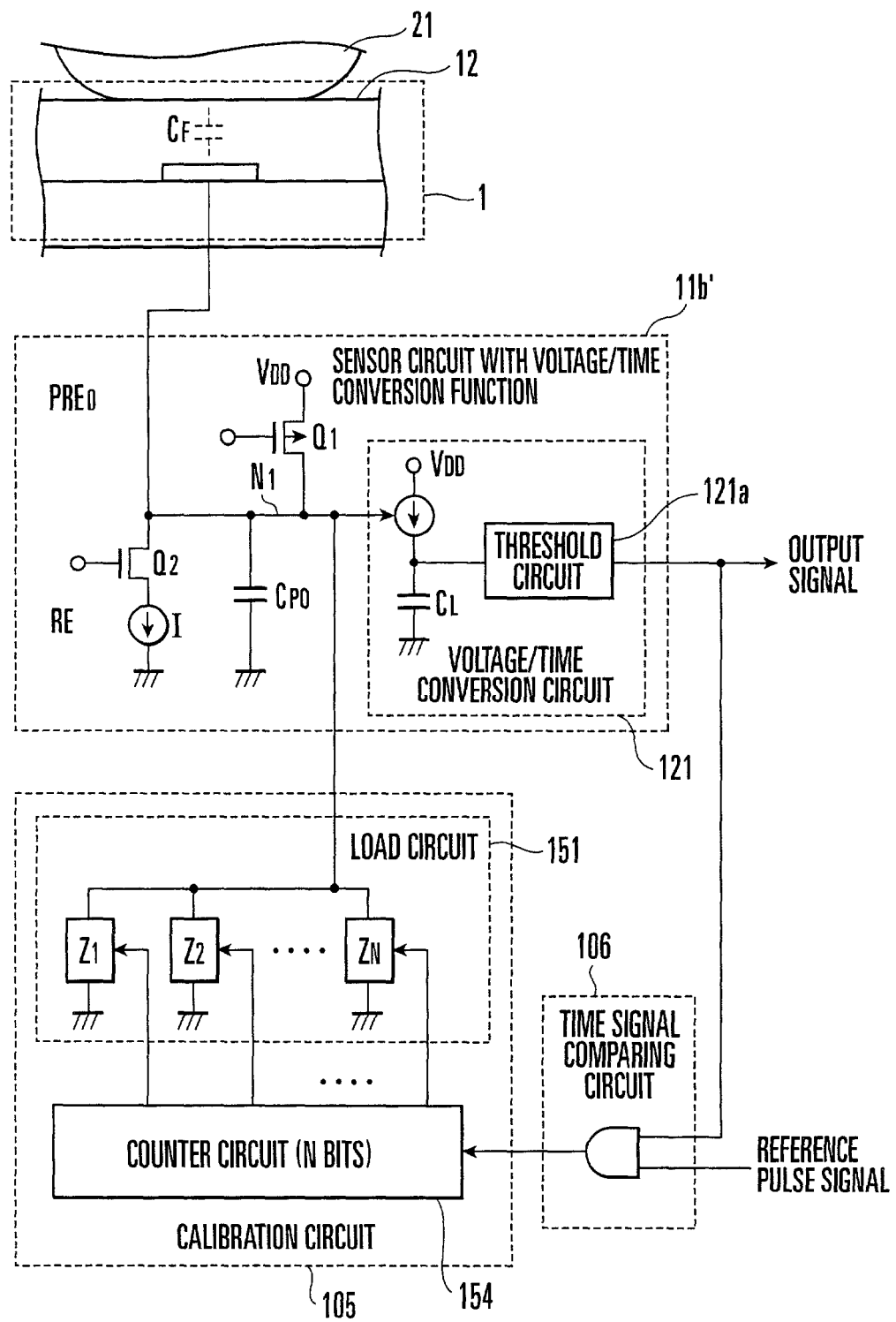
FIG. 13 is a block diagram showing the arrangement of part of the fingerprint collation apparatus according to the second embodiment of the present invention.

FIG. 13 shows an example of the arrangement of each sensor circuit with the voltage/time conversion function. The sensor circuit 11b' with the voltage/time conversion function has, for example, a voltage/time conversion circuit 121. As the voltage/time conversion circuit 121, a general-purpose circuit or the like may be used. Alternatively, this circuit may be comprised of a constant current circuit, capacitive element, and threshold circuit 121a (see, for example, Japanese Patent Application No. 11-157755).

The operation principle of the calibration circuit using the sensor circuit 11b' with the voltage/time conversion function will be briefly described with reference to FIG. 13.

The time signal comparing circuit 106 is typically formed by an AND circuit. The time signal comparing circuit 106 ANDs the output signal 2B from the sensor circuit 11b' with the voltage/time conversion function and the reference pulse signal from the reference pulse signal generating circuit (not shown), and outputs the resultant data as a comparison signal to a counter circuit 154.

The value of the counter circuit 154 is set in advance to an initial set value that controls all load elements $Z_1$ to $Z_N$ constituting a load circuit 151 in an inactive state, and the output signal 2B from the sensor circuit 11b' with the voltage/time conversion function is also set in advance to an initial set value. If the output signal 2B changes earlier than a predetermined time in the first sense operation (for example, sense operation is performed without placing any object such as a finger 21 on the detection surface 12 of the image capturing section 1 and an output signal from the sensor cell changes within a sense time), the counter circuit 154 is counted up by one on the basis of the output from the time signal comparing circuit 106. As a result, the data in the counter circuit 154 changes to activate one of the load elements $Z_1$ to $Z_N$. In addition, the output signal 2B from the sensor circuit 11b' with the voltage/time conversion function is also restored to the initial set value in advance.

If the output signal also changes earlier than a predetermined time in the second sense operation (for example, sense operation is performed without resting a finger 13 and the output signal from the sensor cell changes within the sense time), the counter circuit 154 is further counted up by one. In this case, if the values of the load elements $Z_1$ to $Z_N$ are set to be sequentially doubled in accordance the bits of the counter, twice as many load elements are activated as a consequence. If, for example, $Z_1=Z$, $Z_2=2Z$, $Z_3=4Z$, ..., $Z_N=2^{(N-1)}Z$ are set, and $Z_1$ to $Z_N$ are sequentially controlled from the lower bit of the counter circuit 154, the values of the load elements $Z_1$ to $Z_N$ connected to the sensor circuit 11b' with the voltage/time conversion function sequentially increase by Z every time the counter is counted up.

This operation is repeated until the output signal from the sensor circuit 11b' with the voltage/time conversion function does not change in the predetermined time (for example, sense operation is performed without placing the finger 13, and the output signal from the sensor cell does not change in the sense time). When the output signal does not change in the predetermined time, the counter circuit 154 is ceased to be counted up, and no load element is connected to the sensor circuit 11b' with the voltage/time conversion function any more.

As described above, since no DC current flows in the output level correction system including calibration when voltage/time conversion is performed, the power consumption of the overall apparatus can be reduced as compared with other embodiments.

As described above, variations in the performance of the sensor cells due to process variations and the like can be eliminated by adding the calibration circuit 105 to the sensor circuit 11b and connecting an appropriate number of load elements $Z_1$ to $Z_N$ in the calibration circuit 105 to the sensor circuit 11b. As a consequence, the performances of all sensor cells can be made uniform.

<Third Embodiment>

An image capturing method according to still another embodiment of the present invention will be described next. In this embodiment, a ridge count index is used as an image quality evaluation index. A ridge count index will be described first with reference to FIG. 15. A ridge of a fingerprint appears as a low-grayscale (black) line in a fingerprint image. A ridge count index N is obtained in the following manner. First, average ridge counts of a fingerprint in the horizontal and vertical directions are counted within the fingerprint determination area (n×m pixels) shown in FIG. 15. A larger one of the average ridge counts is then selected as the ridge count index N.

The manner of counting ridges will be described below. When, for example, ridges in the horizontal direction are to be counted, pixels are scanned in the vertical direction, and the number of ridges which the scanning beam crosses is counted. Letting Ni be the ridge count obtained when pixels corresponding to one column are scanned in the vertical direction, since the determination areas includes n columns, the average ridge count corresponding to the n columns is given by $$\sum_{i=1}^{n} Ni/n \qquad (1)$$

Since the length of one column in the vertical direction corresponds to m pixels, an average ridge count Nv in the horizontal direction per a pixel count P is calculated by multiplying mathematical expression (1) by P/m so as to normalize the above average ridge count into a determined count per P pixels according to equation (2):

$$Nv = \frac{\sum_{i=1}^{n} Ni}{n} \times \frac{P}{m} \qquad (2)$$

An average ridge count Nh in the vertical direction per the pixel count P is obtained in the same manner as follows:

$$Nh = \frac{\sum_{i=1}^{m} Ni}{m} \times \frac{P}{n} \quad (3)$$

The ridge count index N is therefore expressed as N=MAX (Nv, Nh), and a larger one of Nv and Nh is set as the ridge count index N.

Figure 16:
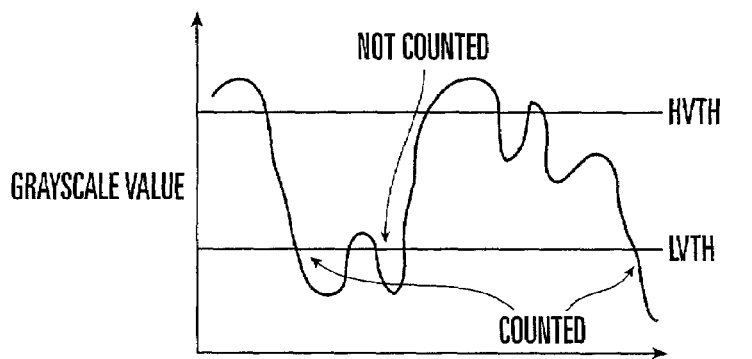
FIG. 16 is a graph for explaining a ridge determination condition.

FIG. 16 explains a ridge determination condition. Referring to FIG. 16, the ordinate represents the grayscale value of each pixel; and the abscissa, the pixels in the vertical or horizontal direction in the determination area. The curve representing the grayscale value of each pixel undulates in accordance with the ridge/valley pattern of a fingerprint image, and the number of undulations indicates the number of ridges. Ridges are counted as follows. For example, two thresholds HVTH and LVTH are used. When the curve crosses the thresholds HVTH and LVTH in the order named, one ridge is counted. In this case, the two thresholds are used to prevent pixels originating from noise and the like from being counted as a ridge. Obviously, HVTH=LVTH may be set to use one threshold.

In addition, ridges can be counted after the grayscale value of a fingerprint image is smoothed. This makes it possible to reduce the influences of fluctuations in the fingerprint image due to noise, apparatus variations, and the like.

If the ridge count index N takes an extremely small value, it indicates a state where the fingerprint image has collapsed. If the ridge count index N takes a large value, it indicates a state where the fingerprint image has faded and ridges have broken. If, therefore, the ridge count index N takes an extremely small value, parameters A and B are adjusted to decrease the image density so as to prevent the image from collapsing. If the ridge count index N takes an extremely large value, the parameters A and B are adjusted to increase the image density. With this operation, an appropriate fingerprint image free from the influences of the density of a fingerprint pattern can be acquired.

Figure 15:
FIG. 15 is a view for explaining a ridge count index.

Note that an ridge count index can also be calculated from valleys (the white lines in the fingerprint image in FIG. 15) instead of the ridges (the black lines in the fingerprint image in FIG. 15). In this case as well, an evaluation index equivalent to a ridge count index can be obtained. Valleys can be counted as follows. Referring to FIG. 16, for example, when the curve crosses the two thresholds LVTH and HVTH in the order named, one valley can be counted. In this case, one threshold can also be set.

Figure 17:
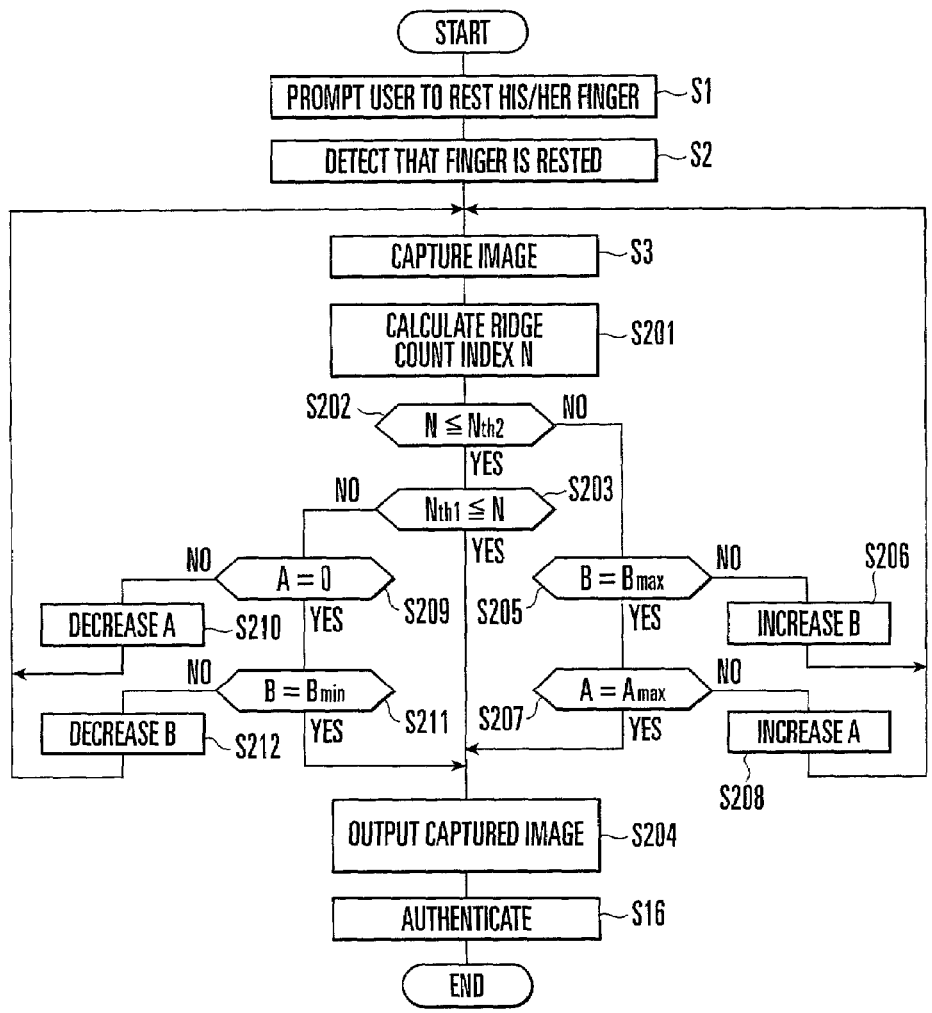
FIG. 17 is a flow chart showing the operation of a fingerprint collation apparatus according to the third embodiment of the present invention.

The apparatus according to this embodiment has the same arrangement as that of the image capturing apparatus (fingerprint collation apparatus) according to each of the other embodiments described above. A capture control section 3a operates as shown in FIG. 17. The operation of the capture control section 3a in the fingerprint collation apparatus according to this embodiment will be described below. Note that a description of constituent elements equivalent to those in FIG. 9 will be omitted as needed.

First of all, the finger resting prompt section 6 prompts the user intending to perform collation to rest his/her finger on a detection surface 12 (FIG. 2) of an image capturing section 1 (step S1). More specifically, for example, the finger resting prompt section 6 prompts the user to rest his/her finger by displaying a prompt using a display unit such as an LED or light-emitting element, turning on a predetermined indication, or outputting a voice message. After a finger resting detection section 7 detects that the user rests his/her finger on the detection surface 12 upon prompting (step S2), the image capturing section 1 captures a fingerprint image and outputs image data 2 (step S3).

When the image data 2 is output, the capture control section 3a calculates the ridge count index N of the captured image as an image quality evaluation index for the image data 2 (step S201). Note that the ridge count index N may be calculated from a predetermined area of the captured image, e.g., an area near the center of the detection surface 12, instead of all the pixels of the captured image. In this case, the ridge count index N can be calculated in a short period of time as compared with the case where all the pixels are targeted.

In steps S202 to S212, the capture control section 3a compares the ridge count index N obtained in the above manner with preset thresholds $N_{th1}$ and $N_{th2}$.

If the capture control section 3a determines in step S202 that the calculated ridge count index N is equal to or less than $N_{th2}$, the flow advances to step S203 to check whether the ridge count index N is equal to or larger than $N_{th1}$. If it is determined in step S203 that the ridge count index N is equal to or more than the threshold $N_{th1}$, the flow advances to step S204, in which the capture control section 3a outputs the captured image data to a collation means 3b.

If it is determined in step S202 that the ridge count index N exceeds the threshold $N_{th2}$, the flow advances to step S205 to check whether the parameter value B set in a parameter setting section 1a is the maximum value.

If it is determined in step S205 that the set parameter value B is not the maximum value, the flow advances to step S206, in which the capture control section 3a increases the parameter value B in the parameter setting section 1a by a predetermined value. The flow then returns to step S3. If it is determined in step S205 that the parameter value B set in the parameter setting section 1a is the maximum value, the flow advances to step S207 to check whether the parameter value A set in the parameter setting section 1a is the maximum value.

If it is determined in step S207 that the set parameter value A is not the maximum value, the flow advances to step S208, in which the capture control section 3a increases the parameter value A in the parameter setting section 1a by a predetermined value. The flow then returns to step S3. If it is determined in step S207 that the parameter value A is the maximum value, the flow advances to step S204, in which the capture control section 3a outputs the captured image data to the collation means 3b.

If $N > N_{th2}$, since it indicates that the captured image is faded and too light-colored, a fingerprint image is captured again upon increasing the parameter values A and B in the above.

If it is determined in step S203 that the ridge count index N is less than the threshold $N_{th1}$, the flow advances to step S209 to check whether the parameter value A set in the parameter setting section 1a is the minimum value, e.g., 0.

If it is determined that the set parameter value A is not 0, the flow advances to step S210, in which the capture control section 3a decreases the parameter value A in the parameter setting section 1a by a predetermined value. The flow then returns to step S3. If it is determined in step S209 that the parameter value A set in the parameter setting section 1a is 0, the flow advances to step S211 to check whether the parameter value B set in the parameter setting section 1a is the minimum value.

If it is determined in step S211 that the set parameter value B is not the minimum value, the flow advances to step S212, in which the capture control section 3a decreases the parameter value B in the parameter setting section 1a by a predetermined value. The flow then returns to step S3. If it is determined in step S211 that the parameter value B is the minimum value, the flow advances to step S204, in which the capture control section 3a outputs the captured image data to the collation means 3b.

If $N < N_{th1}$, since it indicates that the captured image has collapsed, a fingerprint image is captured again upon decreasing the parameter values A and B in the above manner.

The capture control section 3a repeats the above series of operations until the image quality of the image data satisfies a predetermined condition. When the condition is satisfied, the capture control section 3a outputs the image data as an image suitable for authentication to the collation means 3b. As described above, according to this embodiment, a fingerprint image free from collapse or fading can be acquired without being influenced by the density of a fingerprint pattern, individual differences, and state changes.

Note that if the condition cannot be satisfied even when the parameters A and B take the maximum or minimum values, exceptional processing is performed to output the currently captured image.

In this embodiment, the location and size of a fingerprint determination area can be arbitrarily set, as needed.

<Fourth Embodiment>

In this embodiment, a combination of a histogram index and a ridge count index is used as an evaluation index in an image processing apparatus and fingerprint collation apparatus.

For example, parameters A and B may be changed to make each of a histogram index and a ridge count index fall within a predetermined range.

In addition, a new index may be obtained from a histogram index and ridge count index by a predetermined computation, and the parameters A and B may be changed on the basis of this index.

With this arrangement, a fingerprint image with high contrast free from collapse or fading can be acquired without being influenced by the density of a fingerprint pattern, individual differences, and state changes.

In this embodiment, the present invention can be applied upon replacement of the ridge count index with the ridge count index calculated by using valleys as described in the second embodiment.

In the above embodiments, analog values are converted into digital values with 256 grayscale levels. However, such values may be converted into values other than values with 256 grayscale levels.

According to the present invention, the parameter values A and B are used as parameters to be set in the parameter setting section 1a and used for conversion in the image capturing section 1. However, the present invention is not limited to them. For example, to control brightness and resolution, the minimum and maximum values of a signal conversion range may be used as the parameter values A and B. The number of parameters to be set is not limited to this, and can be arbitrarily changed, as needed.

The above embodiments have exemplified the combination of a grayscale index indicating the density of image data and an index indicting the spatial frequency component of an image and the combination of a histogram index generated from a histogram representing the density of an image and a ridge count index generated on the basis of the number of ridges in the image. However, the present invention is not limited to them. Obviously, a new evaluation index may be generated by combining the respective evaluation indexes, as needed.

As has been described above, according to the present invention, image data is captured such that evaluation indexes for an image as, for example, a fingerprint collation target, fall within certain ranges. This produces an excellent effect. That is, an image in a desired state can be obtained. For example, the precision of fingerprint collation can be improved.

What is claimed is:

1. An image capturing apparatus comprising:
   an image capturing section (1) for converting a shape of an object into an electrical quantity in accordance with a parameter value set in a parameter setting section (1a), and outputting image data representing an image corresponding to the shape of the object, said image capturing section comprises:
   a detection element (11a) for converting the shape of the object into an analog signal; and
   an A/D conversion circuit (14) for converting the analog signal output from said detection element into a digital signal in accordance with the parameter value set in said parameter setting section and outputting the signal as the image data, and the parameter value set in said parameter setting section includes a conversion range and conversion resolution in converting the analog signal into the digital signal; and
   a capture control section (3a) for receiving the image data output from said image capturing section, calculating an evaluation index for evaluating image quality of the image from the image data, and if the evaluation index falls outside a range of a preset reference value, changing the parameter value set in said parameter setting section so as to make the evaluation index fall within the range of the reference value to output image data which is received from said image capturing section and the evaluation index of which falls within the range of the reference value,
   wherein the evaluation index calculated by said capture control section is a histogram index generated from a histogram representing a density of the image, and said capture control section calculates, as the histogram index, a ratio between a maximum value on a side of the histogram where a density of the image is high and a minimum value immediately near the maximum value on a side where the density of the image is lower than the density representing the maximum value.

2. An apparatus according to claim 1, wherein when the parameter value set in said parameter setting section is changed, said image capturing section outputs image data obtained by performing conversion again in accordance with the changed parameter value.

3. An image capturing method comprising:
   converting a shape of an object into an electrical quantity in accordance with a preset parameter value to generate image data representing an image corresponding to the shape of the object;
   calculating an evaluation index for evaluating image quality of the image from the image data; and
   changing the parameter value to make the evaluation index fall within a range of a preset reference value,
   wherein the parameter value includes a conversion range and conversion resolution in converting an analog signal into a digital signal, the shape of the object is converted into an analog signal, the analog signal is converted into a digital signal in accordance with the parameter value and output as the image data, the evaluation index is a histogram index generated from a histogram representing a density of the image, and the histogram index is a ratio between a maximum value on a side of the histogram where a density of the image is high and a minimum value immediately near the maximum value on a side where the density of the image is lower than the density representing the maximum value.

4. A fingerprint collation apparatus comprising:

an image capturing section (1) for converting a fingerprint ridge/valley pattern into an electrical quantity in accordance with a parameter value set in a parameter setting section (1a), and outputting image data representing a fingerprint image corresponding to the fingerprint ridge/valley pattern, said image capturing section comprises:

a detection element (11a) for converting the fingerprint ridge/valley pattern into an analog signal; and an A/D conversion circuit (14) for converting the analog signal output from said detection element into a digital signal in accordance with the parameter value set in said parameter setting section and outputting the signal as the image data, and the parameter value set in said parameter setting section includes a conversion range and conversion resolution in converting the analog signal into the digital signal, a capture control section (3a) for receiving the image data output from said image capturing section, calculating an evaluation index for evaluating image quality of the fingerprint ridge/valley pattern image from the image data, and if the evaluation index falls outside a range of a preset reference value, changing the parameter value set in said parameter setting section so as to make the evaluation index fall within the range of the reference value to output image data which is received from said image capturing section and the evaluation index of which falls within the range of the reference value; and collation means for comparing and collating image data output from said capture control section with registered image data prepared in advance, wherein the evaluation index calculated by said capture control section is a histogram index generated from a histogram representing a density of the image, and said capture control section calculates, as the histogram index, a ratio between a maximum value on a side of the histogram where a density of the image is high and a minimum value immediately near the maximum value on a side where the density of the image is lower than the density representing the maximum value.

5. An apparatus according to claim 4, wherein when the parameter value set in said parameter setting section is changed, said image capturing section outputs image data obtained by performing conversion again in accordance with the changed parameter value.

6. A fingerprint collation method comprising:

converting a fingerprint ridge/valley pattern into an electrical quantity in accordance with a preset parameter value to generate image data representing a fingerprint image corresponding to the fingerprint ridge/valley pattern;

calculating an evaluation index for evaluating image quality of the image from the image data;

changing the parameter value to make the evaluation index fall within a range of a preset reference value; and comparing and collating the image data whose evaluation index falls within the range of the reference value with registered image data prepared in advance, wherein the parameter value includes a conversion range and conversion resolution in converting an analog signal into a digital signal, the fingerprint ridge/valley pattern is converted into an analog signal, the analog signal is converted into a digital signal in accordance with the parameter value and output as the image data, the evaluation index is a histogram index generated from a histogram representing a density of the image, and the histogram index is a ratio between a maximum value on a side of the histogram where a density of the image is high and a minimum value immediately near the maximum value on a side where the density of the image is lower than the density representing the maximum value.

7. An image capturing apparatus comprising:

an image capturing section (1) for converting a shape of an object into an electrical quantity in accordance with a parameter value set in a parameter setting section (1a), and outputting image data representing an image corresponding to the shape of the object, said image capturing section comprises:

a detection element (11a) for converting the shape of the object into an analog signal; and an A/D conversion circuit (14) for converting the analog signal output from said detection element into a digital signal in accordance with the parameter value set in said parameter setting section and outputting the signal as the image data, and the parameter value set in said parameter setting section includes a conversion range and conversion resolution in converting the analog signal into the digital signal; and a capture control section (3a) for receiving the image data output from said image capturing section, calculating an evaluation index for evaluating image quality of the image from the image data, and if the evaluation index falls outside a range of a preset reference value, changing the parameter value set in said parameter setting section so as to make the evaluation index fall within the range of the reference value to output image data which is received from said image capturing section and the evaluation index of which falls within the range of the reference value, wherein the evaluation index calculated by said capture control section is a ridge count index generated on the basis of the number of ridges in the image, and said capture control section obtains an average ridge count in the horizontal direction which is an average ridge count per unit length of the image in the horizontal direction and an average ridge count in the vertical direction which is an average ridge count per unit length of the image in the vertical direction, and calculates a larger one of the average ridge count in the horizontal direction and the average ridge count in the vertical direction as the ridge count index.

8. An apparatus according to claim 7, wherein when the parameter value set in said parameter setting section is changed, said image capturing section outputs image data obtained by performing conversion again in accordance with the changed parameter value.

9. An image capturing method comprising:

converting a shape of an object into an electrical quantity in accordance with a preset parameter value to generate image data representing an image corresponding to the shape of the object;

calculating an evaluation index for evaluating image quality of the image from the image data; and changing the parameter value to make the evaluation index fall within a range of a preset reference value, wherein the parameter value includes a conversion range and conversion resolution in converting an analog signal into a digital signal, the shape of the object is converted into an analog signal, the analog signal is converted into a digital signal in accordance with the parameter value and output as the image data, the evaluation index is a ridge count index generated on the basis of the number of ridges in the image, and the ridge count index is a larger one of an average ridge count per unit length of the image in the horizontal direction and an average ridge count per unit length of the image in the vertical direction.

10. A fingerprint collation apparatus comprising:

an image capturing section (1) for converting a fingerprint ridge/valley pattern into an electrical quantity in accordance with a parameter value set in a parameter setting section (1a), and outputting image data representing a fingerprint image corresponding to the fingerprint ridge/valley pattern, said image capturing section comprises:

a detection element (11a) for converting the fingerprint ridge/valley pattern into an analog signal; and an A/D conversion circuit (14) for converting the analog signal output from said detection element into a digital signal in accordance with the parameter value set in said parameter setting section and outputting the signal as the image data, and the parameter value set in said parameter setting section includes a conversion range and conversion resolution in converting the analog signal into the digital signal;

a capture control section (3a) for receiving the image data output from said image capturing section, calculating an evaluation index for evaluating image quality of the fingerprint ridge/valley pattern image from the image data, and if the evaluation index falls outside a range of a preset reference value, changing the parameter value set in said parameter setting section so as to make the evaluation index fall within the range of the reference value to output image data which is received from said image capturing section and the evaluation index of which falls within the range of the reference value; and collation means for comparing and collating image data output from said capture control section with registered image data prepared in advance, wherein the evaluation index calculated by said capture control section is a ridge count index generated on the basis of the number of ridges in the image, and said capture control section obtains an average ridge count in the horizontal direction which is an average ridge count per unit length of the image in the horizontal direction and an average ridge count in the vertical direction which is an average ridge count per unit length of the image in the vertical direction, and calculates a larger one of the average ridge count in the horizontal direction and the average ridge count in the vertical direction as the ridge count index.

11. An apparatus according to claim 10, wherein when the parameter value set in said parameter setting section is changed, said image capturing section outputs image data obtained by performing conversion again in accordance with the changed parameter value.

12. An apparatus according to claim 10, wherein said apparatus further comprises a finger resting detection section for detecting that a finger is rested on said image capturing section, and when said finger resting detection section detects that the finger is rested on said image capturing section, said image capturing section converts a fingerprint ridge/valley pattern into an electrical amount in accordance with a parameter set in said parameter setting section, and outputting image data representing a fingerprint image corresponding to the fingerprint ridge/valley pattern.

13. An apparatus according to claim 4, wherein said apparatus further comprises a finger resting detection section for detecting that a finger is rested on said image capturing section, and when said finger resting detection section detects that the finger is rested on said image capturing section, said image capturing section converts a fingerprint ridge/valley pattern into an electrical amount in accordance with a parameter set in said parameter setting section, and outputting image data representing a fingerprint image corresponding to the fingerprint ridge/valley pattern.

14. A fingerprint collation method comprising:

converting a fingerprint ridge/valley pattern into an electrical quantity in accordance with a preset parameter value to generate image data representing a fingerprint image corresponding to the fingerprint ridge/valley pattern;

calculating an evaluation index for evaluating image quality of the image from the image data;

changing the parameter value to make the evaluation index fall within a range of a preset reference value; and comparing and collating the image data whose evaluation index falls within the range of the reference value with registered image data prepared in advance, wherein the parameter value includes a conversion range and conversion resolution in converting an analog signal into a digital signal, the fingerprint ridge/valley pattern is converted into an analog signal, the analog signal is converted into a digital signal in accordance with the parameter value and output as the image data, the evaluation index is a ridge count index generated on the basis of the number of ridges in the image, the ridge count index is a larger one of an average ridge count per unit length of the image in the horizontal direction and an average ridge count per unit length of the image in the vertical direction.

* * * * *